(12) United States Patent
Millet

(10) Patent No.: US 12,454,866 B2
(45) Date of Patent: Oct. 28, 2025

(54) ROTATIONAL GUIDANCE DEVICE FOR A DRILLING TOOL AND ASSOCIATED METHOD

(71) Applicant: BREAKTHROUGH DESIGN, Antony (FR)

(72) Inventor: François Guy Jacques René Millet, Antony (FR)

(73) Assignee: BREAKTHROUGH DESIGN, Antony (FR)

( * ) Notice: Subject to any disclaimer, the term of this patent is extended or adjusted under 35 U.S.C. 154(b) by 0 days.

(21) Appl. No.: 18/532,543

(22) Filed: Dec. 7, 2023

(65) Prior Publication Data

US 2024/0191583 A1   Jun. 13, 2024

(30) Foreign Application Priority Data

Dec. 8, 2022   (FR) ........................................ 2212987

(51) Int. Cl.
*E21B 17/10*   (2006.01)

(52) U.S. Cl.
CPC ................................ *E21B 17/1057* (2013.01)

(58) Field of Classification Search
CPC ...... E21B 7/067; E21B 17/04; E21B 17/1057; E21B 17/1064
See application file for complete search history.

(56) References Cited

U.S. PATENT DOCUMENTS

| | | | |
|---|---|---|---|
| 2,891,769 A * | 6/1959 | Page, Sr. ............. | E21B 17/1014 175/76 |
| 4,895,214 A | 1/1990 | Schoeffler | |
| 10,081,983 B2 * | 9/2018 | Kirkhope ................. | E21B 7/06 |
| 2009/0166089 A1 * | 7/2009 | Millet ..................... | E21B 7/067 175/73 |
| 2016/0084003 A1 * | 3/2016 | Kirkhope ................ | F16C 41/02 464/178 |
| 2016/0123083 A1 * | 5/2016 | Gaikwad ................ | E21B 7/067 175/57 |
| 2019/0128070 A1 | 5/2019 | Du et al. | |

FOREIGN PATENT DOCUMENTS

| | | | |
|---|---|---|---|
| FR | 2898935 A1 | 9/2007 | |
| FR | 2989749 A1 | 10/2013 | |
| WO | 8600111 A1 | 1/1986 | |
| WO | 9964712 A1 | 12/1999 | |

OTHER PUBLICATIONS

French Search Report for FR2212987 dated Jun. 22, 2023, 2 pages.

* cited by examiner

*Primary Examiner* — Yanick A Akaragwe
(74) *Attorney, Agent, or Firm* — NIXON & VANDERHYE

(57) ABSTRACT

A device for guiding a drilling tool in rotation, the device including a tubular longitudinal element, a transmission shaft passing longitudinally through the tubular element, the shaft being rotatably mounted in the tubular element for rotating the drilling tool, the guiding device including bearing blocks mounted between the tubular element and the shaft, each bearing block being attached to at least one attachment region on the shaft, characterized in that the bearing block including at least one tapered bore ball-joint roller bearing, wherein at least in the attachment region, the shaft has a taper less than or equal to 1:12 and/or bend radii greater than $\frac{1}{12}^{th}$ of the outer diameter of the shaft.

11 Claims, 3 Drawing Sheets

ROTATIONAL GUIDANCE DEVICE FOR A DRILLING TOOL AND ASSOCIATED METHOD

This application claims priority to FR 2212987 filed Dec. 8, 2022, the entire contents of which are hereby incorporated by reference.

The present invention relates to a rotational guidance device for a drilling tool including a tubular longitudinal element, a transmission shaft longitudinally crossing through the tubular element, the shaft being rotatably mounted in the tubular element in order to rotate the drilling tool in and to transmit axial forces thereto, the guiding device comprising bearing blocks mounted between the tubular element and the shaft, each bearing block being attached to at least one attachment region on the shaft.

Such a device is intended to be used in drilling in the fields of the oil industry, civil engineering, geothermal energy and more generally in all fields of underground intervention without trenches.

Such a device is used in all types of drilling, from a fully mechanical drilling to drilling incorporating electronic equipment.

Such a device is intended to form e.g. a non-rotating stabilizer included in a drill string or to be used in a downhole motor with an elbow connection, or else in a directional drilling tool.

Such a device is configured e.g. to guide a drilling tool in rotation and transmit to all the forces of a drill string thereto. The above corresponds to a transmission of power through the device. The drill string is controlled by a drive system located on the surface of the excavation.

A device of the aforementioned type is known from FR 2 898 935, comprising a shaft longitudinally crossing through a tubular longitudinal element, the shaft being rotatably mounted in the tubular element. The device includes a bearing mounted between the tubular element and the shaft, the bearing being attached to at least one attachment region on the shaft. The bearing block forms a pivot linkage, a sliding pivot linkage, an annular linear linkage or ball joint linkage between the shaft and the element. The bearing block is locked axially on the shaft by a shoulder or groove.

However, such a device can be further improved. A shaft having such a shoulder has lower resistance to fatigue than a smooth shaft, in particular in rotary bending due to stress concentrations.

Furthermore, the cost and the time required for manufacturing such a shaft can be significant, since the manufacture of a shaft having shoulders involves the use of a preform before machining the shaft and/or a considerable removal of material by turning a large diameter. Such operations are expensive in terms of raw material and machining. The stress concentration factors are also increased at the cross-sectional discontinuities of the shaft.

In addition, maintenance can generally be done only from one side, involving the complete disassembly of the device regardless of the extent of the repair.

A goal of the invention is thus to obtain a device for guiding a drilling tool in rotation which has an increased service life, while limiting manufacturing and maintenance costs.

To this end, the subject matter of the invention relates to a device of the aforementioned type, characterized in that the bearing block includes at least one tapered bore ball-joint roller bearing for forming a pivot linkage, a sliding pivot linkage, ball joint linkage or an annular linear linkage between the tubular element and the shaft, and wherein, at least in the attachment region, the shaft has a taper less than or equal to 1:12 and/or bend radii greater than $1/12^{th}$ of the outer diameter of the shaft.

The guiding device according to the invention can further have one or a plurality of the features below, taken individually or according to all technically conceivable possible:
- the shaft has a central body and ends protruding axially from the central body, the shaft having a variation of diameter of less than 5% over the entire central body and advantageously the ends;
- the bearing block includes at least one abutment having a cylindrical outer surface and a tapered inner bore;
- the shaft has at least one annular or helical groove and the bearing block includes at least one split tapered ring received on the groove having a bore with a shape matching the groove and a tapered outer surface on which the abutment is mounted;
- the bearing block includes a spacer applied over the attachment region between the abutment and the roller bearing;
- the bearing block includes a disassembly sleeve applied over the attachment region, the disassembly sleeve having a threaded collar, the tapered bore ball-joint roller bearing being rigidly attached to the shaft by means of the disassembly sleeve;
- the bearing block has a rotary sealing device comprising an inner part rigidly attached to the shaft, the inner part being screwed onto the threaded collar of the disassembly sleeve;
- the device includes a removable hoop for clamping an element rotated by the shaft or rotating the shaft, at least at one of the ends of the shaft, the bearing block including a rotary sealing device comprising an inner part rigidly attached to the shaft, the bearing being fitted with a shimming spacer compensating the play between the inner part of the rotary sealing device and the removable hoop clamp;
- the shaft is flexible, the tubular element including a main body and a housing which can be swiveled with respect to the main body by bending the shaft, at least one first bearing block being arranged between the main body and the shaft, at least one second bearing block being arranged between the swiveling housing and the shaft, the guiding device including at least one central bearing block with an additional roller bearing ensuring at least one annular linear linkage between the main body and the shaft;
- the tubular element is rigid against bending.

A further subject matter of the invention is a method of replacing a roller bearing of the guiding device, the method comprising the following steps:
- disassembling, if need be, a rotary sealing device;
- separation of the roller bearing from the shaft by extraction, if appropriate, of a disassembly sleeve of the bearing block;
- moving the roller bearing to one end of the shaft by sliding on the shaft without disassembling the shaft of the tubular element;
- remounting the roller bearing or a replacement roller bearing without disassembling the shaft of the tubular element;
- rigidly attaching the shaft roller bearing, if appropriate by remounting the disassembly sleeve;
- remounting, if need be, the rotary sealing device.

The invention will be better understood upon reading the following description, given only as an example and making reference to the enclosed drawings, wherein.

A device 10 for guiding in rotation according to the invention is used in a well drilling installation.

The drilling installation includes a surface installation (not shown). The surface installation rotates and transmits axial forces to a drilling tool 12 by means of a drill string 14, through the guiding device 10.

Hereinafter, the terms "upstream" and "downstream" are used in relation to the normal direction of advance of the drilling.

The surface installation comprises means for supporting, for rotating and transmitting axial forces of the drilling tool 12 and means for circulating a drilling liquid.

The drill string 14 is rotated by the surface installation. The drill string consists of a plurality of cylindrical tubes (not shown) transmitting torque and axial forces to the guiding device 10. The cylindrical tubes are oriented along a main axis Z-Z of the well.

Figure 1:
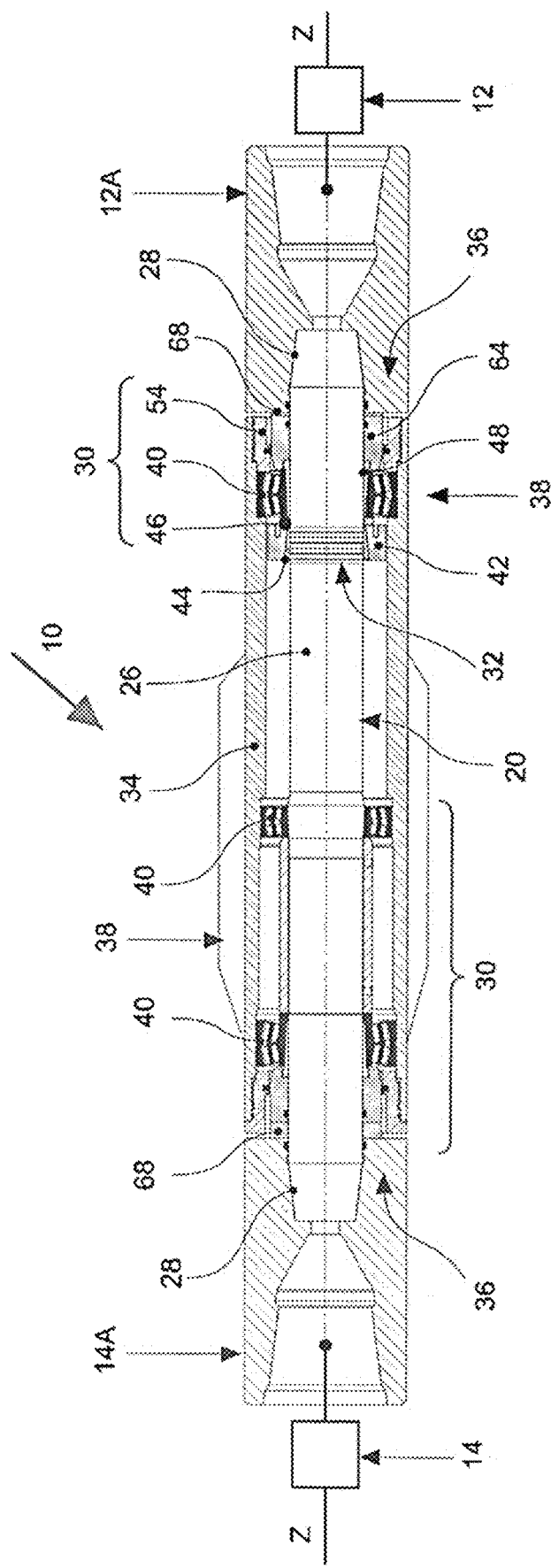
FIG. 1 is a schematic view in partial section along a median plane of a first device according to the invention, arranged e.g. in a non-rotating stabilizer.

A first example of guiding device 10 according to the invention is represented in FIG. 1. Advantageously, in the example shown in FIG. 1, the device 10 forms a non-rotary stabilizer.

The guiding device 10 includes a shaft 20 rotated by the drill string 14, a tubular element 34 rotatably supporting the shaft 20 and bearing blocks 38 rotatably guiding the shaft 20 inside the tubular element 34 in contact with the wall of the well being drilled.

The shaft 20 has a central passage 22 and a substantially cylindrical outer surface. The shaft 20 is located in the continuation of the drill string 14 and is oriented along the main axis Z-Z of the well.

In the first example, the shaft 20 is rigid and includes a high flexural modulus making the guiding device 10 not very flexible perpendicularly to the axis Z-Z. "Rigid" means that the shaft 20 has a maximum bending deformation angle of less than 0.1° between two bearing blocks. In a variant which will be described hereinbelow, the shaft 20 is flexible and has a minimum bending deformation angle greater than 0.2° between two bearing blocks.

The shaft 20 includes a central body 26 having a smooth outer surface and ends 28 protruding axially with respect to the central body 26. The ends 28 of the shaft 20 are connected to the drill string 14 by an upstream threaded connection 14A and to the drilling tool 12 by a downstream threaded connection 12A. The upstream threaded connection 14A and the downstream threaded connection 12A are in particular provided with tapered threads and have herein a frustotapered shape.

The shaft 20 has attachment regions 30 for the bearings blocks 38, on the outer surface of the shaft. The attachment regions 30 are in particular located on the central body 26, adjacent to the ends 28 of the shaft 20.

At least in each attachment region 30, preferentially throughout the length of the shaft with the exception of the ends 28, the outer surface of the shaft 20 is substantially cylindrical.

The shaft 20 has variations of diameter of less than 5% between the smallest diameter of the shaft 20 in the attachment region 30 and the largest diameter of the shaft 20 in the same attachment region 30 and advantageously throughout the length of the shaft with the exception of the ends 28 or including the ends 28.

In addition, at least in each attachment region 30, preferentially throughout the length of the shaft 20 with the exception of the ends 28 or including the ends 28, the shaft 20 has a taper less than or equal to 1:12 and/or bend radii greater than $\frac{1}{12}^{th}$ of the outside diameter of the shaft in the attachment region 30.

Advantageously, at least in each attachment region 30, preferentially throughout the length of the shaft 20 with the exception of the ends 28 or including the ends 28, in a projection in any half-plane passing through the main axis Z-Z, the outer surface of the shaft 20 is continuously derivable, the outer surface thus having no discontinuity of slope on the projected curve of the outer surface of the shaft 20.

Figure 2:
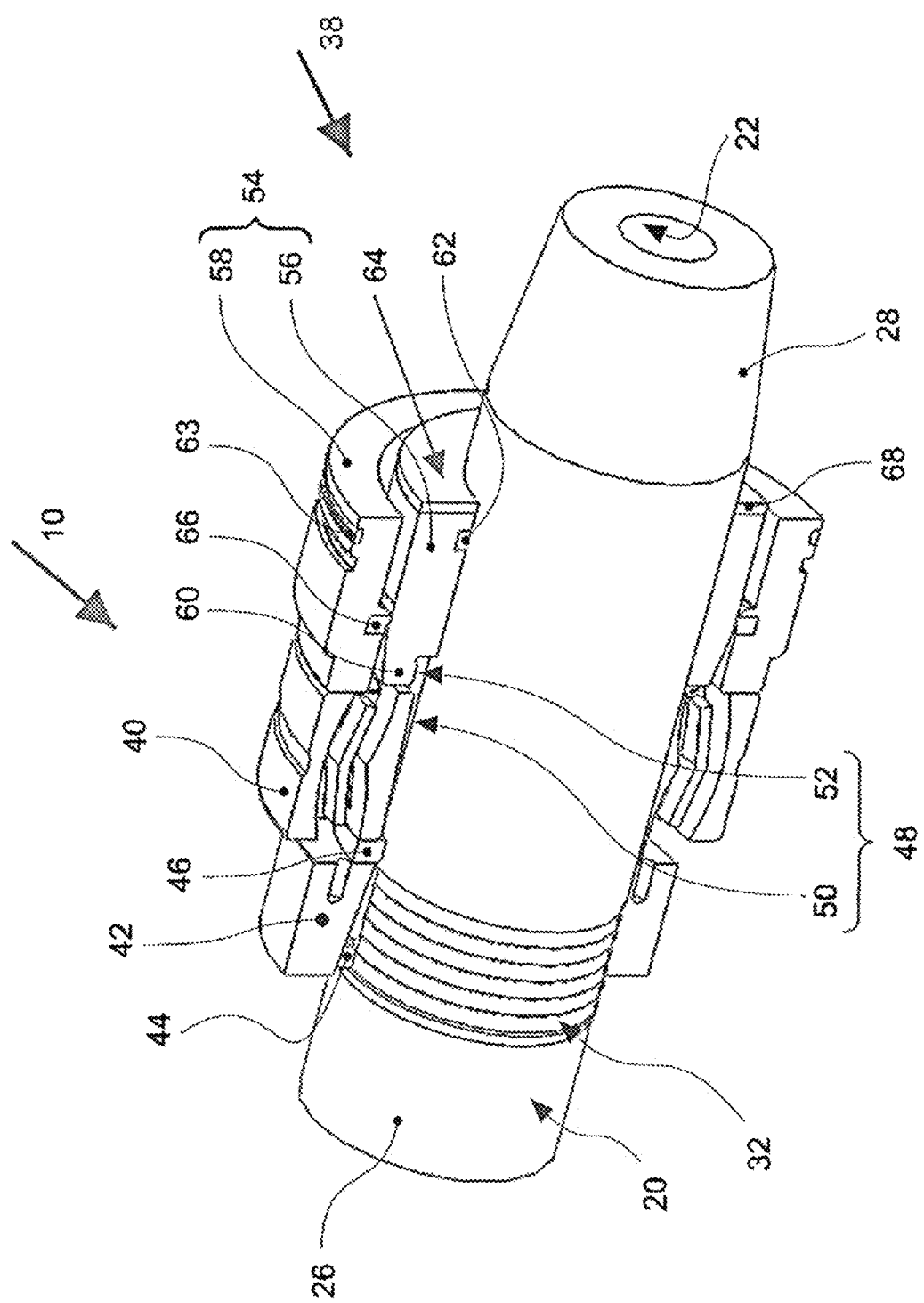
FIG. 2 is a perspective partially cutaway view along a median plane of one end of the shaft of the device shown in FIG. 1, equipped with a bearing block.

An attachment region 30 is illustrated in FIG. 2. The attachment regions 30 form the region where the roller bearings 38 are applied.

In the attachment region 30, the shaft 20 preferentially includes at least one annular or helical groove 32 provided in the outer surface of the shaft 20.

With reference to FIG. 1, the tubular element 34 defines a central housing and a cylindrical outer surface advantageously equipped with shoes for abutting against the wall of the well while allowing the drilling mud to circulate. The tubular element 34 is oriented along the main axis Z-Z of the well, in the continuation of the drill string 14. The tubular element 34 receives the shaft 20 in the central housing along the same orientation axis Z-Z.

The length along the main axis Z-Z of the tubular element 34 coincides with the length of the central body 26 of the shaft 20. In the example shown in FIG. 1, the tubular element 34 is in one piece throughout the entire length thereof. Advantageously, at least one end 28 of the shaft 20, advantageously the two ends 28 of the shaft 20 come out on both sides with respect to the tubular element 34.

The central housing of the tubular element 34 opens out at the ends thereof, via axial openings 36.

The tubular element 34 delimits, at the ends thereof, annular cavities for housing the bearing blocks 38 between the shaft 20 and the tubular element 34. The annular cavities continue axially from the central housing.

The tubular element 34 is intended to come into abutment on the wall of the drilled well and to remain fixed or substantially fixed in rotation with respect to the wall of the well.

Each bearing block 38 forms a pivot linkage, a sliding pivot linkage, an annular linear linkage or ball joint linkage between the element 34 and the shaft 20. The shaft 20 is rotated by the drill string 14, the tubular element 34 remaining fixed or substantially fixed in rotation about the axis Z-Z with respect to the wall of the well being drilled by means of the linkage formed by the bearing blocks 38.

An example of bearing block 38 is shown in FIG. 2.

The bearing block 38 includes a tapered bore ball-joint roller bearing 40 providing the aforementioned ball joint linkage or annular linear linkage.

The bearing block 38 further includes a rear abutment 42 having a cylindrical outer surface and a tapered bore. Same further comprises a split tapered ring 44 for mounting the rear abutment 42.

The abutment 42 cooperates with the tapered ring 44 so that the abutment and the ring form an axial stop. The abutment 42 is positioned on the shaft 20 in the attachment region 30 axially opposite the end 28 of the shaft 20.

The tapered ring 44 has a central passage complementary to the profile of at least one circular or helical groove of the shaft and a tapered outer surface.

The tapered ring 44 is mounted fixed on the shaft 20 at the annular or helical groove 32. The tapered surface of the tapered ring 44 is inserted in a matching way into the tapered bore of the abutment 42. The tapered ring 44 and the abutment 42 are thereby in axial coincidence along the main axis Z-Z, the abutment 42 being attached in translation along the shaft 20.

The bearing block 38 further includes a spacer 46 arranged in contact with the abutment 42 along the main axis Z-Z. The spacer 46 is herein a ring connecting the abutment 42 with the inner ring of the roller bearing 40.

The roller bearing 40 is a tapered roller bearing having a cylindrical outer surface and a tapered inner bore. The roller bearing 40 includes an inner ring, intended to be rotated together with the shaft 20, an outer ring intended to be fixed in rotation in the housing of the tubular element 34 and barrel-shaped rollers interposed between the inner ring and the outer ring.

The bearing block 38 includes a disassembly sleeve 48 with a cylindrical inner surface resting on the shaft 20 on which the roller bearing 40 is mounted. The disassembly sleeve 48 is rotated by the shaft 20. The disassembly sleeve 48 associated with the abutment 42 allows the internal ring of the roller bearing 40 to be temporarily fitted with respect to the shaft 20.

The disassembly sleeve 48 includes a support skirt 50 for the roller bearing 40 and a threaded collar 52. The support skirt 50 has a tapered outer surface on which the roller bearing 40 is mounted.

The disassembly sleeve 48 includes a cylindrical inner surface applied fixedly onto the cylindrical attachment region 30 by axial thrust during assembly along the axis Z-Z towards the abutment 42.

The threaded collar 52 has a threaded cylindrical outer surface. Herein, same is made in one piece with the support skirt 50 of the bearing. The threaded collar 52 is located closer to the end 28 of the shaft 20 than the support skirt 50.

The bearing block 38 further includes a rotary sealing device 54. The rotary sealing device 54 includes an inner part 56 fixed with respect to the shaft 20 and an outer part 58 fixed with respect to the tubular element 34, the outer part 58 being concentric and mounted around the inner part 56.

The inner part 56 is advantageously screwed onto the collar 52 of the disassembly sleeve 48.

The inner part 56 includes a tapped crown 60 matching the thread of the collar 52 of the disassembly sleeve 48.

The tapped crown 60 is apt to be screwed onto the thread of the threaded collar 52 of the disassembly sleeve 48. The inner part 56 is thereby rotated about the axis Z-Z.

The sealing device 54 further comprises an inner annular seal 62. The inner annular seal 62 is interposed in a sealed way between the shaft 20 and the inner part 56 about the axis Z-Z. The inner annular seal 62 is apt to being rotated by the shaft 20. The inner part 56 being screwed onto the disassembly sleeve 48, a rotary assembly 64 including the inner annular seal 62, the inner part 56, the disassembly sleeve 48, the inner ring of the roller bearing 40, the abutment 42, the tapered ring 44 and the spacer 46 are integrally rotated about the axis Z-Z by the shaft 20.

The sealing device 54 includes an outer rotary annular seal 66. The outer annular seal 66 is placed between the inner part 56 and the outer part 58. The outer annular seal 66 is suitable for making possible the rotation of the inner portion 56 with respect to the outer portion 58. The rotary annular seal 66 is a single or double lip seal or is a KALSI seal.

The sealing device 54 further includes an external annular seal 63. The outer annular seal 63 is placed between the outer part 58 and the tubular element 34. The annular seal 63 is suitable for providing a sealing between the outer part 58 and the tubular element 34.

The bearing block 38 further includes a shimming front spacer 68 mounted on the shaft 20. The shimming spacer 68 is pressed against the inner part 56 of the sealing device 54 along the main axis Z-Z and against the threaded connection 12A or 14A shown in FIG. 1.

The shimming spacer 68 is the part of the bearing block 38 closest to the end 28 of the shaft 20 associated with the bearing block 38.

Due to the structure which has just been described, the roller bearings 40 of each bearing block 38 can be easily rigidly attached, temporarily, with the shaft 20 and disassembled from the latter in order to be replaced.

A method for replacing the roller bearings 40 of the guiding device 10 will now be described. The method is implemented for roller bearings 40 in a bearing block 38 adjacent to one end 28 of the shaft 20 or for a bearing block 38 in contact with a shaft 20 that is smooth as far as one of the ends 28 thereof.

In a first phase, the shimming spacer 68 is disassembled from the sealing device 54.

The sealing device 54 is then disassembled by unscrewing the tapped crown 60 with respect to the threaded collar 52 and by extracting the outer part 58 of the sealing device 54 from the tubular element 34. The roller bearing 40 is then directly accessible.

The disassembly sleeve 48 is extracted by sliding same along the shaft 20 towards the end 28 by means of a hydraulic extraction tool screwed onto the collar 52 of the disassembly sleeve 48 and abutting the inner ring of the bearing 40. The bearing 40 is then removed.

A new bearing 40 is then inserted until same abuts against the ring 46. The disassembly sleeve is then pushed axially by bearing onto the end 28 of the shaft 20. Finally, the sealing device 54 is mounted, followed by the shimming spacer 68.

The replacement method does not require the disassembly of the shaft 20 from the tubular element 34.

The substantially smooth outer surface of the shaft 20 according to the invention makes possible an easy assembly and disassembly of the roller bearings 40, the roller bearings 40 being apt to slide along the shaft 20.

In another embodiment (not shown), the shaft 20 has a region 30 having a tapered surface on which the tapered bore of the ball-joint roller bearing 40 is mounted directly. The tapered region of the shaft 20 axially and radially attaches the bearing 40 with respect to the shaft 20 without the use of a disassembly sleeve 48.

The sealing device 54 is then adjacent to the roller bearing 40 without the presence of the threaded collar 52.

In another embodiment, the tapered threads of the ends 28 of the shaft 20 are replaced by cylindrical parts used for the attachment of shrink-fitted connections advantageously hydraulically controlled. The bearing block 38 advantageously includes a removable ring (not shown) as described in FR 2 989 749. The hoop extends between the sealing device 54 and the drilling tool 12 or the drill string 14, around the end 28 of the shaft 20.

The shimming spacer 68 is advantageously present between the sealing device and the hoop, guaranteeing that there is no play between the inner part 56 of the rotary sealing device 54 and the removable hoop clamp.

The hoop is apt to rigidly attach, temporarily, an element rotated by the shaft 20 or rotating the shaft 20.

The hoop is apt to be activated between a loose configuration and a tightening configuration of the element. The hoop advantageously includes at least one clamping hole suitable for receiving a fluid for moving the hoop and a plug. The hoop is apt to change from a loosening configuration to the tightening configuration thereof by pumping fluid and, if appropriate, by fitting in a nut as described in FR 2 989 749.

Figure 3:
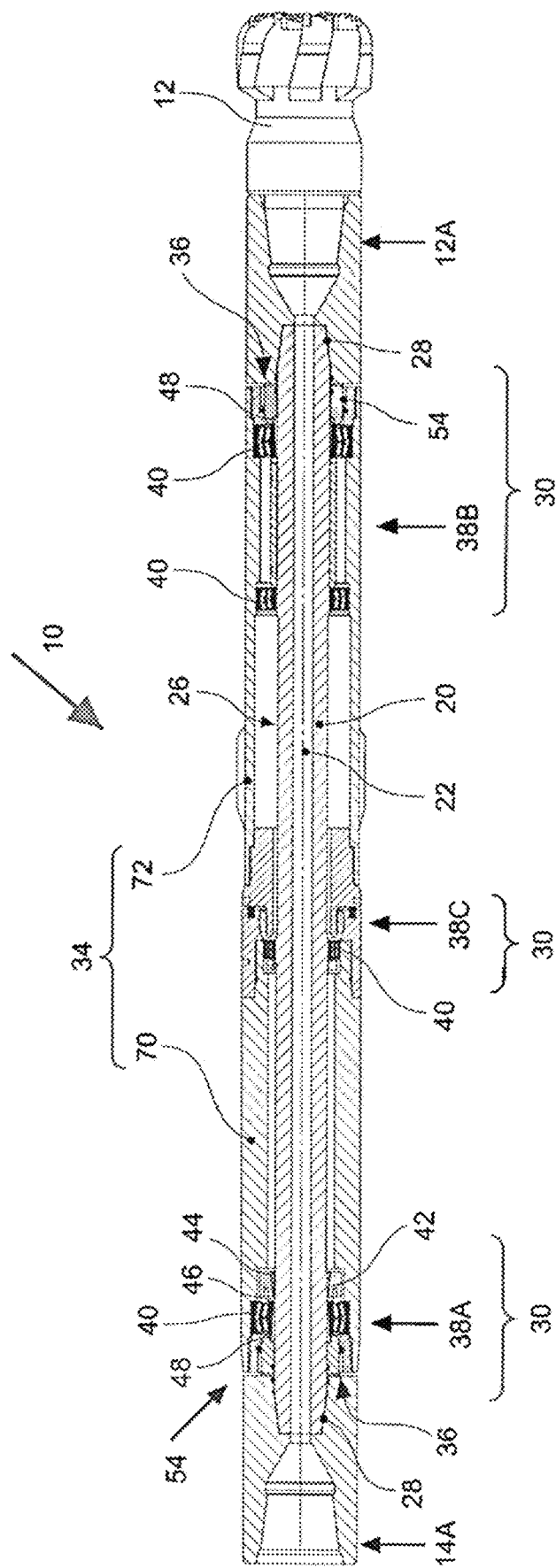
FIG. 3 is a schematic partial section view along a median plane of a second device according to the invention, arranged e.g. in a directional drilling tool.

In another embodiment, visible in FIG. 3, the guiding device 10 is integrated into a directional drilling tool, as described in FR 2 898 935.

Unlike the device 10 of FIG. 1, the tubular element 34 includes a main body 70 and a housing 72 that can be swiveled with respect to the main body 70 between a straight position visible in FIG. 3 and a plurality of tilted positions with respect to the main body 70.

The main body 70 is positioned upstream of the swiveling housing 72. The tubular element 34 includes in particular at least one fitting located between the main body 70 and the housing 72 which can be swiveled along the main axis Z-Z.

The shaft 20 is flexible and crosses along the main axis Z-Z through the main body 70 and the swiveling housing 72. The maximum bending angle of the shaft 20 is comprises e.g. between 0.5° and 1.5° taken between the ends thereof.

The guiding device 10 includes a first bearing block 38A linking the main body 70 to the shaft 20 and a second bearing block 38B linking the swiveling housing 72 to the shaft 20. The two bearing blocks 38A, 38B are located on the attachment regions 30 close to the ends 28 of the shaft 20.

The guiding device 10 further includes a central bearing block 38C between the main body 70 and the shaft 20. The central bearing block 38C provides an annular linear linkage between the main body 70 and the shaft 20. The central bearing block 38C is arranged close to the end of the main body 70 located on the same side as the swiveling housing 72.

The central bearing block 38C includes a tapered bore ball-joint roller bearing 40 with a locking ring. The shaft 20 having a tapered seat in the attachment region 30. The roller bearing 40 is locked axially using the locking ring screwed or pinned on the shaft 20.

The use of tapered bore ball-joint roller bearing 40 makes the rotary linkage between the shaft 20 and each of the main body 70 and the swiveling housing 72 reliable, even when the shaft 20 is bent and the swiveling housing is tilted e.g. in order to carry out a directional drilling.

In an embodiment visible in FIGS. 1 and 3, the bearing block 38B includes a plurality of tapered bore ball-joint roller bearing 40.

More generally, the device according to the invention 10 includes a shaft 20 which is substantially smooth and hence very resistant to fatigue, in particular under rotary bending. Indeed, stress concentrations at the surface of the shaft 20 are prevented since the shaft has no shoulders.

The calculated service life of such a shaft 20 under rotary bending is thereby greatly extended, is even endless with 90% reliability, while providing an optimal directional capacity of the system.

The presence of a substantially smooth outer surface simplifies the machining of the shaft 20 and thus reduces costs and production time.

The exclusive use of the tapered bore ball-joint roller bearing 40 leads to obtaining robust performance, due to the ability thereof to self-align, no bending deformation affecting the operation of the roller bearing 40. In addition, no play is possible between the inner rings of the roller bearings 40 rigidly attached to the shaft 20.

In addition, the linear contact between rollers and bushings and the large number of rollers allow the roller bearings 40 to withstand high loads, including in the presence of vibrations, as well as good resistance to shocks.

The tapered bore ball-joint roller bearings 40 are interesting because same are standard and accessible worldwide, ensuring easy, fast and economical maintenance.

In addition, the tapered bore ball-joint roller bearings 40 are generally stabilized at 200° C., thereby ensuring better reliability during drilling.

The removable hoop as described in FR 2 989 749 is used for the axial locking of the bearing block 38 while ensuring the linkage between the shaft 20 and the drill string 14 and/or the drilling tool 12.

The spacer 46 and the shimming spacer 68 are used for simple adjustments of the position of the parts of the bearing blocks 38 along the main axis Z-Z while avoiding the precise machining of the parts of the bearing block 38, of the tubular element 34 and of the shaft 20. As a result, manufacturing and maintenance costs are reduced.

The sealing device 54 associated with the static seals 62 and 63 are used for the pressurization of the device 10.

The replacement of the roller bearings 40 and the maintenance of the device 10 are thus simple and easy. The replacement of the roller bearings 40 can be carried out close to the drilling site and makes quick and economical maintenance possible. In addition, the substantially smooth shaft 20 gives access to both sides of the shaft 20 and of the device 10 for maintenance, the tubular element 34 does not need to be disassembled in order to replace the parts of the bearing block 38 located at the ends of the shaft 20.

In a preferred embodiment, the shaft is rotatably mounted non-slidably in the tubular element.

In the light of the foregoing, it should be noted that since the shaft is through, the bearing blocks are not subjected to the axial force transmitted by the drill string 14 to the drilling tool 12 by the shaft 20.

Similarly, the buckling limit of the shaft 20, due to the drilling forces, is advantageously greater than the maximum axial force transmitted by the drill string 14 to the shaft 20.

It follows from the foregoing that the maximum bending angle of the shaft 20, comprised e.g. between 0.5° and 1.5°, is taken between the tangents of the ends thereof.

As specified hereinabove, the device according to the invention 10 includes a shaft 20 which is substantially smooth and hence very resistant to fatigue, in particular under rotary bending, more particularly because stress concentrations at the surface of the shaft 20 are prevented since the shaft has no shoulders, collars and/or grooves.

Moreover, the presence of a substantially smooth outer surface, in addition to simplifying the machining of the shaft 20 and reducing the production times as mentioned hereinabove, further makes it possible to reduce the energy required for the production of the shaft 20.

As shown in FIG. 2, which shows the attachment region 30, but wherein the tubular element 34 is not shown, the bearing block 38 includes e.g. at least one abutment having a cylindrical outer surface and a tapered inner bore. Preferentially, the bearing block 38 is filled with degassed oil and is pressurized for the pressurization of the device 10.

Such a guiding device is thereby e.g. intended to be used in a directional drilling tool.

The invention claimed is:

1. A device for guiding a drilling tool in rotation, the device comprising:
   a tubular longitudinal element;
   a transmission shaft passing longitudinally through the tubular longitudinal element, the transmission shaft being rotatably mounted in the tubular longitudinal element in order to rotate the drilling tool and to transmit axial forces thereto; and
   a plurality of bearing blocks mounted between the tubular longitudinal element and the transmission shaft, each of the bearing blocks being attached to at least one attachment region on the transmission shaft, at least one of the bearing blocks including at least one tapered bore spherical roller bearing forming one of a pivot linkage, a sliding pivot linkage, a ball joint linkage, and a linear annular linkage between the tubular longitudinal element and the transmission shaft, the at least one tapered bore spherical roller bearing having a tapered inner bore,
   wherein, at least in the at least one attachment region, the transmission shaft has one or more of: (i) a taper less than or equal to 1:12 and (ii) at least one annular or helical shallow U-shape groove with a fillet radii greater than $1/12^{th}$ of the outer diameter of the transmission shaft,
   wherein at least one of the bearing blocks includes at least one abutment having a cylindrical outer surface and a tapered inner bore, and
   wherein at least one of the bearing blocks includes at least one split tapered ring received on the at least one annular or helical shallow U-shape groove, the at least one split tapered ring having a bore with a shape matching the at least one annular or helical groove and a tapered outer surface on which the at least one abutment is mounted, the at least one annular or helical groove being recessed in the transmission shaft.

2. The guiding device according to claim 1, wherein the transmission shaft has a central body and ends protruding axially from the central body, the transmission shaft having a variation of diameter of less than 5% over the central body and advantageously the ends.

3. The guiding device according to claim 1, wherein the at least one bearing block includes a spacer applied over the at least one attachment region disposed between the at least one abutment and the at least one tapered bore spherical roller bearing.

4. The guiding device according to claim 1, wherein at least one of the bearing blocks includes a withdrawal sleeve applied over the at least one attachment region, the withdrawal sleeve having a threaded collar, the at least one tapered bore spherical roller bearing being rigidly attached to the transmission shaft by the withdrawal sleeve, the withdrawal sleeve being received in the tapered inner bore of the at least one tapered bore spherical roller bearing.

5. The guiding device according to claim 4, wherein at least one of the bearing blocks includes a rotary sealing device comprising an inner part rigidly attached to the transmission shaft, the inner part being screwed onto the threaded collar of the withdrawal sleeve.

6. The guiding device according to claim 1, wherein ends of the transmission shaft have tapered threads on which an element rotated by the transmission shaft or rotating the transmission shaft is threaded.

7. The guiding device according to claim 1, wherein the transmission shaft is flexible, the tubular longitudinal element having a main body and a steerable housing configured to be tilted with respect to the main body by bending the transmission shaft, at least one first bearing block of the plurality of bearing blocks being disposed between the main body and the transmission shaft, and at least one second bearing block of the plurality of bearing blocks being disposed between the steerable housing and the transmission shaft, the guiding device including at least one central bearing block including an additional roller bearing ensuring at least one annular linear linkage between the main body and the transmission shaft.

8. A method for replacing a roller bearing of the guiding device according to claim 1, the method comprising:
   disassembling a rotary sealing device;
   separating the at least one tapered bore spherical roller bearing from the shaft by extraction of a withdrawal sleeve of the at least one bearing block;
   moving the at least one tapered bore spherical roller bearing to one end of the transmission shaft by sliding on the transmission shaft without disassembling the transmission shaft of the tubular longitudinal element;
   remounting the at least one tapered bore spherical roller bearing or at least one replacement tapered bore spherical roller bearing without disassembling the transmission shaft of the tubular longitudinal element;
   rigidly attaching the at least one tapered bore spherical roller bearing to the transmission shaft by remounting the withdrawal sleeve; and
   remounting the rotary sealing device.

9. The guiding device according to claim 1, wherein all of the bearing blocks include at least one tapered bore spherical roller bearing forming one of a pivot linkage, a sliding pivot linkage, a ball joint linkage, and a linear annular linkage between the tubular longitudinal element and the transmission shaft, the at least one tapered bore spherical roller bearing comprising a plurality of tapered bore spherical roller bearing each having a tapered inner bore in which the shaft extends.

10. A device for guiding a drilling tool in rotation, the device comprising:
    a tubular longitudinal element;
    a transmission shaft passing longitudinally through the tubular longitudinal element, the transmission shaft being rotatably mounted in the tubular longitudinal element in order to rotate the drilling tool and to transmit axial forces thereto; and
    a plurality of bearing blocks mounted between the tubular longitudinal element and the transmission shaft, each of the bearing blocks being attached to at least one attachment region on the transmission shaft, at least one of the bearing blocks including at least one tapered bore spherical roller bearing forming one of a pivot linkage, a sliding pivot linkage, a ball joint linkage, and a linear annular linkage between the tubular longitudinal element and the transmission shaft, the at least one tapered bore spherical roller bearing having a tapered inner bore in which the transmission shaft extends,
    wherein, at least in the at least one attachment region, the transmission shaft has one or more of: (i) a taper less than or equal to 1:12 and (ii) at least one annular or helical shallow U-shape groove with a fillet radii greater than $1/12^{th}$ of the outer diameter of the transmission shaft,
    wherein at least one of the bearing blocks includes at least one abutment having a cylindrical outer surface and a tapered inner bore, and
    wherein the transmission shaft has at least one annular or helical groove and the at least one bearing block includes at least one split tapered ring received on the groove having a bore with a shape matching the at least one annular or helical groove and a tapered outer surface on which the at least one abutment is mounted.

11. A device for guiding a drilling tool in rotation, the device comprising:
- a tubular longitudinal element;
- a transmission shaft passing longitudinally through the tubular longitudinal element, the transmission shaft being rotatably mounted in the tubular longitudinal element in order to rotate the drilling tool and to transmit axial forces thereto; and
- a plurality of bearing blocks mounted between the tubular longitudinal element and the transmission shaft, each of the bearing blocks being attached to at least one attachment region on the transmission shaft, at least one of the bearing blocks including at least one tapered bore spherical roller bearing forming one of a pivot linkage, a sliding pivot linkage, a ball joint linkage, and a linear annular linkage between the tubular longitudinal element and the transmission shaft, the at least one tapered bore spherical roller bearing having a tapered inner bore in which the transmission shaft extends,
- wherein, at least in the at least one attachment region, the transmission shaft has one or more of: (i) a taper less than or equal to 1:12 and (ii) at least one annular or helical shallow U-shape groove with a fillet radii greater than $1/12^{th}$ of the outer diameter of the transmission shaft, and
- wherein at least one of the bearing blocks includes a withdrawal sleeve applied over the at least one attachment region, the withdrawal sleeve having a threaded collar, the at least one tapered bore spherical roller bearing being rigidly attached to the transmission shaft by the withdrawal sleeve, the withdrawal sleeve being received in the tapered inner bore of the at least one tapered bore spherical roller bearing.

* * * * *